(12) United States Patent
Shapiro et al.

(10) Patent No.: US 10,112,329 B2
(45) Date of Patent: Oct. 30, 2018

(54) OVERMOLDED DISPOSABLE CUTLERY ARTICLES

(71) Applicant: MODERN PACKAGING LLC, Chicago, IL (US)

(72) Inventors: Benjamin Shapiro, Chicago, IL (US); Christopher Wlezien, Chicago, IL (US); Martin Rathgeber, Chicago, IL (US); Matthew Shapiro, Chicago, IL (US); Tuan Nguyen, Clinton, MA (US)

(73) Assignee: Modern Packaging LLC, Chicago, IL (US)

( * ) Notice: Subject to any disclaimer, the term of this patent is extended or adjusted under 35 U.S.C. 154(b) by 350 days.

(21) Appl. No.: 14/930,602

(22) Filed: Nov. 2, 2015

(65) Prior Publication Data

US 2017/0120490 A1    May 4, 2017

(51) Int. Cl.
| | |
|---|---|
| B29C 45/16 | (2006.01) |
| B26B 3/02 | (2006.01) |
| A47J 43/28 | (2006.01) |
| A47G 21/02 | (2006.01) |
| B29L 31/28 | (2006.01) |
| B29C 45/00 | (2006.01) |

(52) U.S. Cl.
CPC .............. *B29C 45/16* (2013.01); *A47G 21/02* (2013.01); *A47J 43/281* (2013.01); *A47J 43/283* (2013.01); *A47J 43/288* (2013.01); *B26B 3/02* (2013.01); *B29C 45/0046* (2013.01); *B29K 2995/002* (2013.01); *B29K 2995/0026* (2013.01); *B29K 2995/0029* (2013.01); *B29L 2031/286* (2013.01)

(58) Field of Classification Search
CPC combination set(s) only.
See application file for complete search history.

(56) References Cited

U.S. PATENT DOCUMENTS

| | | | | |
|---|---|---|---|---|
| 243,889 | A | * 7/1881 | Hart | A47G 21/02 30/322 |
| 2,335,872 | A | 12/1943 | Mitchell | |
| 2,680,984 | A | * 6/1954 | Ingwer | B25B 13/12 76/114 |
| 3,185,001 | A | * 5/1965 | Viator | B25G 1/105 16/430 |
| 4,422,995 | A | 12/1983 | Schad | |

(Continued)

FOREIGN PATENT DOCUMENTS

| | | |
|---|---|---|
| CN | 2465885 Y | 12/2001 |
| CN | 202742712 U | 2/2013 |

(Continued)

OTHER PUBLICATIONS

International Search Report and Written Opinion, Appl. No. PCT/US2015/058671, dated Jan. 5, 2016.

(Continued)

*Primary Examiner* — Victor D Batson
*Assistant Examiner* — Matthew J Sullivan
(74) *Attorney, Agent, or Firm* — Winston & Strawn LLP

(57) ABSTRACT

A dual shot molded article of cutlery that includes a working end molded from a first material and a molded handle opposite the working end. The article is designed with one or more features that facilitate the efficient and effective manufacture of such products by an overmolding or coreback molding process.

24 Claims, 10 Drawing Sheets

(56) References Cited

U.S. PATENT DOCUMENTS

| | | | |
|---|---|---|---|
| 4,440,820 A | 4/1984 | Shiho et al. | |
| 4,479,630 A | 10/1984 | Wernecke | |
| 4,535,014 A | 8/1985 | Wright | |
| 5,049,343 A | 9/1991 | Sorensen | |
| 5,290,063 A | 3/1994 | Lenhart | |
| D353,050 S | 12/1994 | Moskovich | |
| 5,376,325 A | 12/1994 | Ormson | |
| 5,615,445 A | 4/1997 | Kelsay et al. | |
| 5,721,404 A | 2/1998 | Toedtman | |
| 5,920,943 A | 7/1999 | Barker | |
| 5,956,799 A | 9/1999 | Panaccione et al. | |
| 6,108,869 A | 8/2000 | Meessmann et al. | |
| 6,117,384 A | 9/2000 | Laurin et al. | |
| D446,426 S | 8/2001 | Riemer | |
| 6,276,020 B1 | 8/2001 | Leversby et al. | |
| 6,368,536 B1 | 4/2002 | Hoepfl et al. | |
| D479,103 S | 9/2003 | McMullin | |
| 6,634,877 B2 | 10/2003 | Sicilia et al. | |
| 6,749,788 B1 | 6/2004 | Holden et al. | |
| 6,821,468 B2 | 11/2004 | Stegmaier | |
| D499,938 S | 12/2004 | McMullin | |
| 6,983,542 B2 | 1/2006 | Mithal et al. | |
| 7,234,939 B2 | 6/2007 | Bills | |
| D555,433 S | 11/2007 | Koennecke | |
| D572,543 S | 7/2008 | Koennecke | |
| 7,487,007 B2 | 2/2009 | MacDonald et al. | |
| 7,526,869 B2 | 5/2009 | Blatter et al. | |
| 7,694,378 B2 | 4/2010 | Tsurukawa et al. | |
| 7,811,497 B2 | 10/2010 | Balint et al. | |
| 8,012,393 B2 | 9/2011 | Hager | |
| 8,012,398 B2 | 9/2011 | Zadesky et al. | |
| 8,032,991 B2 * | 10/2011 | Lawless | B25G 1/105 16/430 |
| D654,695 S | 2/2012 | Jimenez et al. | |
| 8,153,045 B2 | 4/2012 | Boor | |
| D675,868 S | 2/2013 | Liming et al. | |
| D675,869 S | 2/2013 | Gallop | |
| D675,870 S | 2/2013 | Gallop | |
| D675,871 S | 2/2013 | Gallop | |
| 8,414,813 B2 | 4/2013 | Jung et al. | |
| 8,726,518 B2 | 5/2014 | Bruno | |
| 8,747,100 B2 | 6/2014 | Grimm | |
| 8,993,098 B2 | 3/2015 | Masanek, Jr. et al. | |
| 9,549,626 B2 * | 1/2017 | Truog | B25F 1/00 |
| 2002/0014720 A1 | 2/2002 | Sicilia et al. | |
| 2006/0191145 A1 | 8/2006 | Mithal et al. | |
| 2007/0079685 A1 | 4/2007 | Mizek | |
| 2009/0119860 A1 | 5/2009 | Amsel | |
| 2009/0143767 A1 | 6/2009 | Fentress et al. | |
| 2009/0144991 A1 | 6/2009 | Synnestvedt et al. | |
| 2010/0192388 A1 | 8/2010 | Mithal et al. | |
| 2011/0146015 A1 | 6/2011 | Moskovich et al. | |
| 2011/0219631 A1 | 9/2011 | Hou et al. | |
| 2013/0047528 A1 | 2/2013 | Masanek, Jr. et al. | |
| 2013/0174366 A1 | 7/2013 | Stebila et al. | |
| 2016/0039129 A1 * | 2/2016 | Hou | A47G 19/02 76/104.1 |
| 2017/0119184 A1 * | 5/2017 | Truog | A47G 21/06 |
| 2017/0120490 A1 * | 5/2017 | Shapiro | B29C 45/16 |

FOREIGN PATENT DOCUMENTS

| | | | |
|---|---|---|---|
| CN | 103568200 A | 2/2014 | |
| DE | 2334977 A1 * | 1/1975 | B25G 1/10 |
| DE | 3622596 A1 * | 1/1987 | B25G 1/10 |
| DE | 10 2004 060 876 A1 | 6/2006 | |
| FR | 2 622 512 A3 | 5/1989 | |
| GB | 1 379 930 A | 1/1975 | |
| GB | 2 274 615 A | 8/1994 | |
| JP | 2002-361680 A | 12/2002 | |
| WO | 2010/130949 A1 | 11/2010 | |

OTHER PUBLICATIONS

Colgate toothbrush with diamond pattern in handle, May 22, 2014.
Colgate Wave Gum Comfort Toothbrush. http://www.colgate.com/en/us/oc/products/toothbrush/colgate-wave-gum-comfort-toothbrush. Retrieved on Oct. 17, 2015.
Toothbrush (2013).
Gillette MACH3® Sensitive Disposable Razor. http://gillette.com/en-us/products/razor-blades/mach3-razors/mach3-sensitive-disposable-razor. Retrieved on Oct. 17, 2015.
Gillette Mach III Razor (2013).
Noxzema Spa Shave 4 Blade Shaver. http://www.bing.com/images/search?q=noxzema+spa+shaver+review&view=detailv2&&id=071C4CFD52C29A79740EA29A75C454ABF69050F4&selectedIndex=0&ccid=eXUGkeTj&,simid=607998328547378825&thid=OIP.M79750691e4e3652ef4d2c3c318fdb827o0&ajaxhist=0. Retrieved on Oct. 27, 2015.
Noxzema Spa Shaver (2013).

* cited by examiner

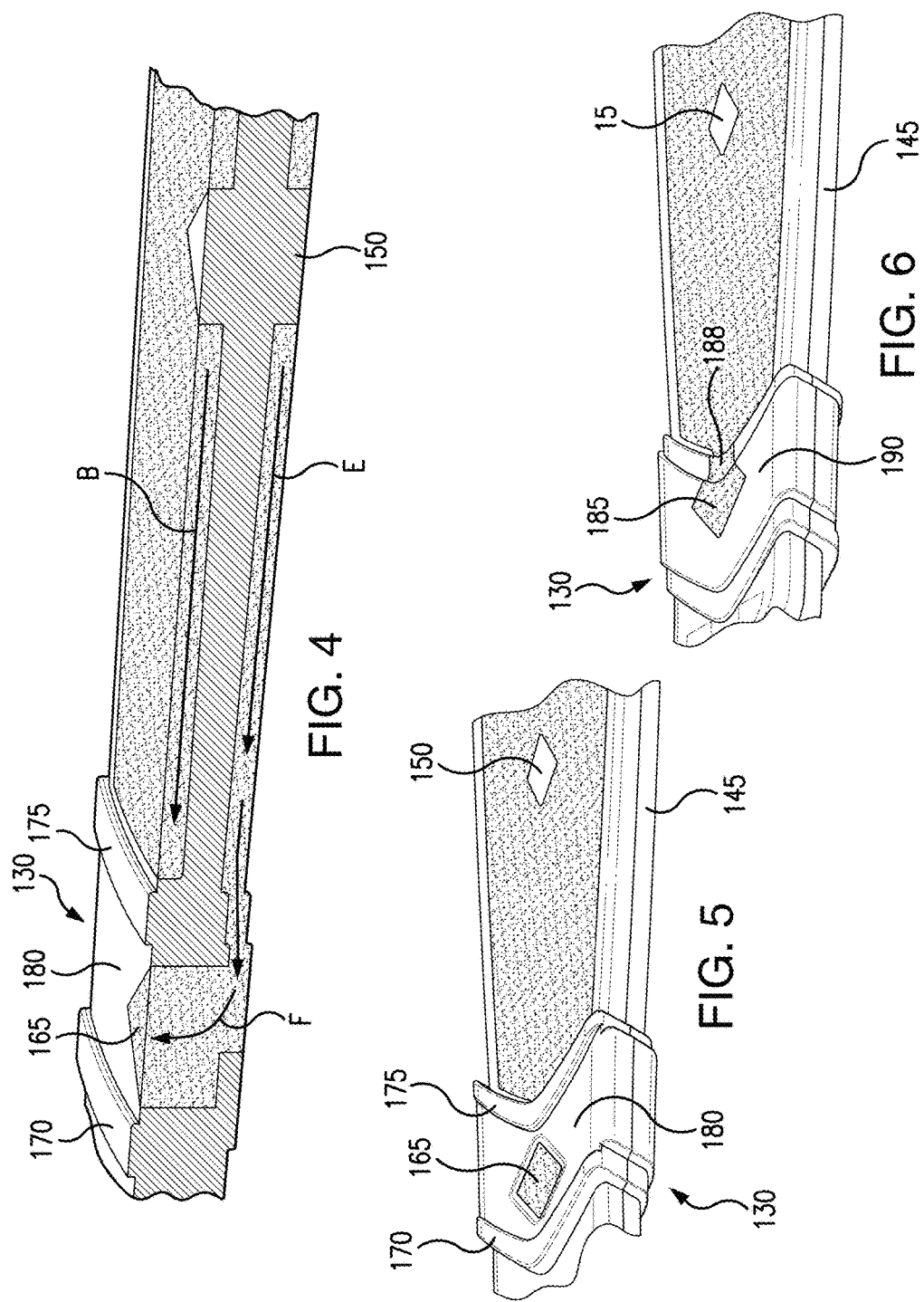

OVERMOLDED DISPOSABLE CUTLERY ARTICLES

BACKGROUND

The invention relates to articles that include design features that facilitate rapid production when utilizing a two-shot overmolding process to produce articles such as disposable cutlery.

It is generally known to use a two-shot molding process to manufacture articles having different colors or different features. For example, US patent publications 2011/0219631 and 2013/0047528 and U.S. Pat. Nos. 5,049,343, 7,487,007, 7,811,497, 8,012,398, 8,414,813 and 8,747,100 disclose various molding production techniques. In short, these known, general state-of-the-art processes have considerable drawbacks in that specific, numerous, and therefore costly or oversized tools, must be used, requiring relatively long cycle times and often creating insufficient and imperfect quality pieces. Thus, as can be seen, the existing techniques do not meet the need that exists for so-called "aesthetic" pieces such as those currently needed for the preparation of smaller articles such as utensils.

Therefore, a need exists to provide an inexpensive and easily-adapted process to enable making multi-material, locally overmolded pieces (or elements of pieces), particularly those consisting of different color or material, which can be made at high production rates with a very high level of quality, particularly as regards the finish and aesthetic appearance of the final product. Accordingly and in particular, there is a need for improved designs of articles such as disposable cutlery to facilitate the efficient and effective manufacture of such products. The present invention now addresses this need.

SUMMARY OF THE INVENTION

The invention relates to a molded article of cutlery comprising a first shot molded structure comprising a working end and an elongated handle support molded from a first material; wherein the first shot molded structure includes either (a) one or more first openings configured for allowing passage of second shot material, or (b) one or more sidewalls that extend above and about the perimeter of the elongated handle extending to the working end to provide a border around the perimeter of the handle and to fully surround or encompass the second shot molded structure. Preferably, (a) and (b) are present in the article.

The invention also relates to a dual shot molded article of cutlery comprising a working end molded from a first material; and a molded handle opposite the working end. The handle advantageously includes a first shot molded structure of the first material and a second shot molded structure of a second material, with a first shot molded structure including part of the transition portion adjacent the working end and part of an elongated handle that includes islands at least on the upper portion thereof; and with the second shot molded structure including top and bottom handle portions that form the upper and lower surfaces of the handle. To facilitate overmolding of the second shot molded structure, the first shot molded structure includes a first opening through which a second material for the second shot molded structure passes for connecting the upper and lower surfaces of the handle.

Alternatively, the first shot molded structure may be designed to have sidewalls that extend above and about the perimeter of the elongated handle to provide a border around the perimeter of the top handle portions of the second shot molded structure. Advantageously, the first shot molded structure is also designed to have sidewalls that extend below and about the perimeter of the elongated handle to provide a border around the perimeter of the bottom handle portions of the second shot molded structure. The sidewalls have at least partially flat top surfaces to conform to mold surfaces. Additionally, the first opening of the first shot molded structure is preferably located adjacent the sidewalls on the end of the article that is furthest away from the working end. In particular, the opening is V- or U-shaped and one or more openings can be provided.

The first shot molded structure may also provide one or more additional openings along the length of the handle portion to facilitate flow of the second shot material. The second shot molded structure encompasses the handle portion of the first shot but not the sidewall(s) to form the overmolded handle. The plurality of islands on the handle of the first shot molded structure preferably have top surfaces that are not covered by the second shot. When so configured, the additional opening or openings are located adjacent an island or adjacent each island.

The molded handle preferably includes a transition area connected to the working end, wherein the first shot molded structure includes a further opening in the transition area through which the second shot material passes to connect the lower surface of the handle with an upper portion of the transition area. When the handle of the first shot molded structure includes islands on the upper portion thereof, the bottom portion thereof or on both portions thereof, at least the islands on the bottom portion are configured to have zero degree drafts. And when the islands are present both on the upper and lower parts of the handle, they have top surface portions that are flush with but not covered by the upper and lower surfaces of the second shot.

In these articles, the molded handle includes a transition area connected to the working end, and wherein the first shot molded structure includes a second opening in the transition area through which the second material passes to connect the lower surface of the handle with an upper portion of the transition area; and the islands are preferably present both on the upper and lower parts of the handle and have top portions that are flush with the upper and lower surfaces of the second shot. Preferably, the first shot is configured to have zero degree drafts to minimize flashing of the second material of the second shot and to also facilitate the retraction of the inserts and the reconfiguration of mold parts before the second material is injected.

Additionally, the upper portion of the handle of the first shot molded structure is preferably angled, tapered or sloped such that the second shot molded structure is thickest at one end of the handle and is thinnest in the opposite end of the handle. When the second material is injected at the furthermost end of the handle, the second shot molded structure is thickest at that location and tapers to a thinner cross-section at the transition area to facilitate flow of the second material. Additionally, the lower portion of the handle of the first shot molded structure is similarly angled, tapered or sloped such that the second shot molded structure is thickest at the furthermost end of the handle and is thinnest at the transition. Furthermore, the working end of the utensil is configured to only be part of the first shot molded structure to facilitate molding of that part of the utensil. This envisions the first material being introduced at or near the end of the article to flow toward the working end so that the working end of the article fills in last.

The invention also relates to a method of making the molded articles of cutlery as disclosed herein by molding and combining the first and second molded structures to form an overmolded article having contrasting colors. In particular, one structure has a color or is transparent or translucent while the other structure is transparent or translucent or has a different color.

For optimum molding results, the first shot molded structure preferably includes combinations of two or more or even all of the foregoing features. The design lends itself to molded articles of cutlery or eating utensils that have a working end of a fork, spoon or knife, but can also be used for other molded articles.

BRIEF DESCRIPTION OF THE DRAWINGS

Preferred features of the invention will now be described in connection with the appended drawings, wherein:

FIG. 4 is a cross-sectional view of the transition area and handle to illustrate further flow details of the second shot material along the back side of the first shot and into the transition area;

FIG. 5 is a perspective view of the top of the handle and transition area of the front of the molded article;

FIG. 6 is a perspective view of the bottom of the handle and transition area of the back of the molded article;

DETAILED DESCRIPTION OF THE INVENTION

The present invention is preferably directed to plastic cutlery and a molding method for making such cutlery. The term "cutlery" is used herein to refer to eating utensils such as knives, spoons, forks, salad forks, soup spoons, butter knives, steak knives, cocktail forks, serving forks and spoons, tongs, chop sticks, cake cutters, spatulas, ladles, food picks, kitchen utensils, and the like, all of which are characterized by a handle and a working part joined to the handle to form a tool. The handle is the part grasped by the user. The term "working part" in the present context of cutlery is the part opposite and joined to the handle of the cutlery that is configured to be used in the processes of holding, cutting, manipulating, serving, consuming or conveying food and that comes into contact with food in process and/or into contact with the mouth of the user.

As used herein, the term "plastic" means a material that may be fixed in a desired shape by molding. The plastic may be a resin and in particular a synthetic resin either based on petrochemicals or other biological materials such as cellulose, soybeans or agricultural by-products, all of which are often polymerized on cooling and may thus be formed in the desired shape by using injection-molding from resin particles or beads. The shaped plastic must be sufficiently rigid for use as cutlery and tableware and may derive its strength inherently, or when augmented by the configuration into which it is molded, that is, with ribs and beads for stiffening of hollowed areas, or by the use of reinforcing fibers. The plastic must also be capable of pigmentation in a variety of colors, texturization, and be non-toxic and able to incorporate additives. The plastic is also ideally inexpensive and readily available in large quantities. It also include materials having an elastomeric nature that can be injection molded. Additionally, other injection moldable materials such as elastomers, polyurethanes may be used in essentially the same manner as the plastic materials described herein.

In the following, the various molded plastic articles of the invention will be preferably illustrated as cutlery although as noted herein other molded articles can be made by the present invention.

In the description that follows, the term "first shot" will be used to define the first molded structure that is obtained by molding a first resin, while the term "second shot" will be used to define the second molded structure that is overmolded on the first shot to form the final article.

Figure 1A:
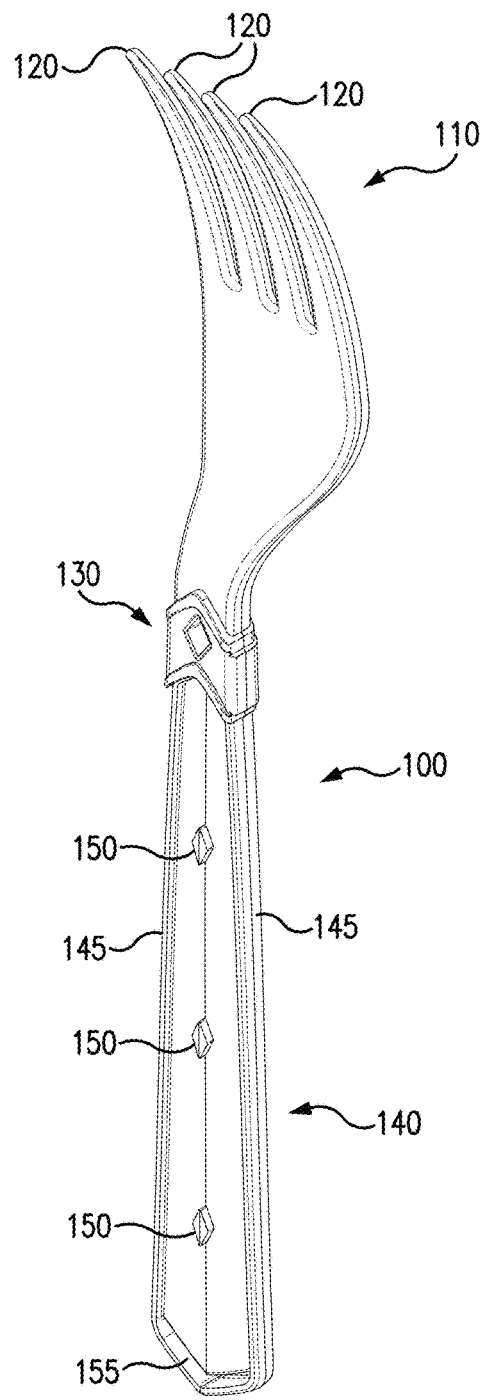
FIG. 1A is a front perspective view of a first shot molded structure for an overmolded fork which is illustrated as a preferred embodiment of the present invention.
Figure 1B:
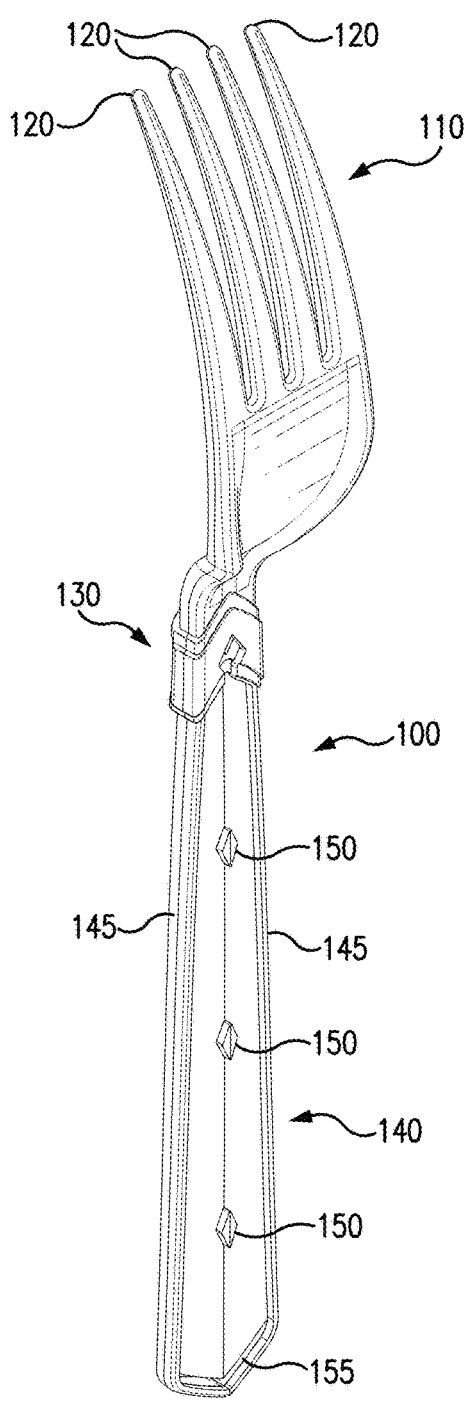
FIG. 1B is a back perspective view of the first shot molded structure of FIG. 1A.

FIGS. 1A and 1B illustrate a first shot 100 of a fork as a preferred embodiment of a disposable article that can be provided by co-injection molding according to the present invention. The first shot 100 of the fork includes a working end 110 that includes tines 120, a transition portion 130 and a handle 140. The first shot of the handle 140 includes sidewalls 145, islands 150 and an opening shown as hole 155.

Figure 1C:
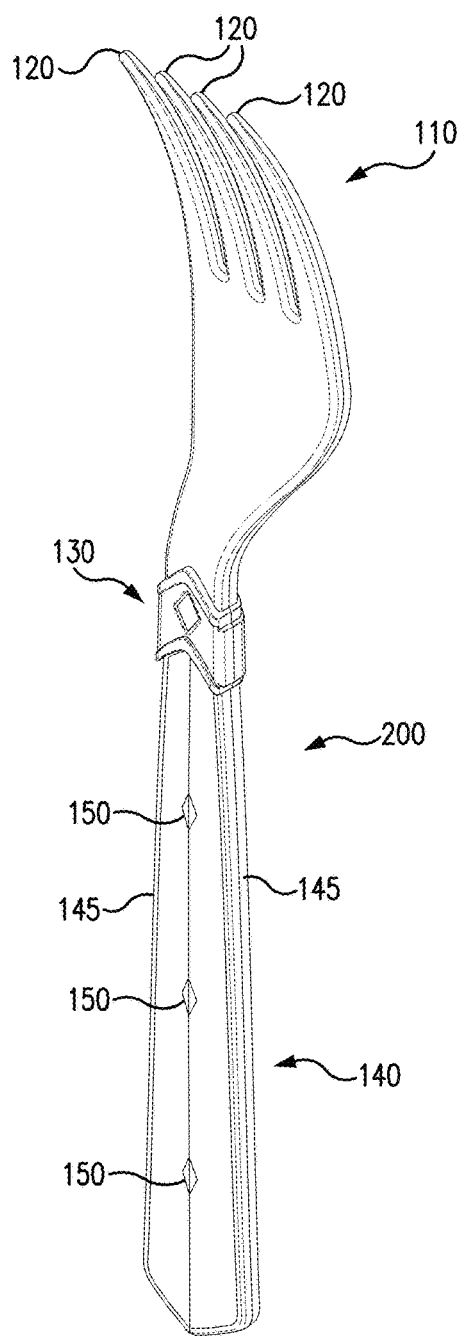
FIG. 1C is a front perspective view of the final molded fork that includes the first and second shot molded structures)
Figure 1D:
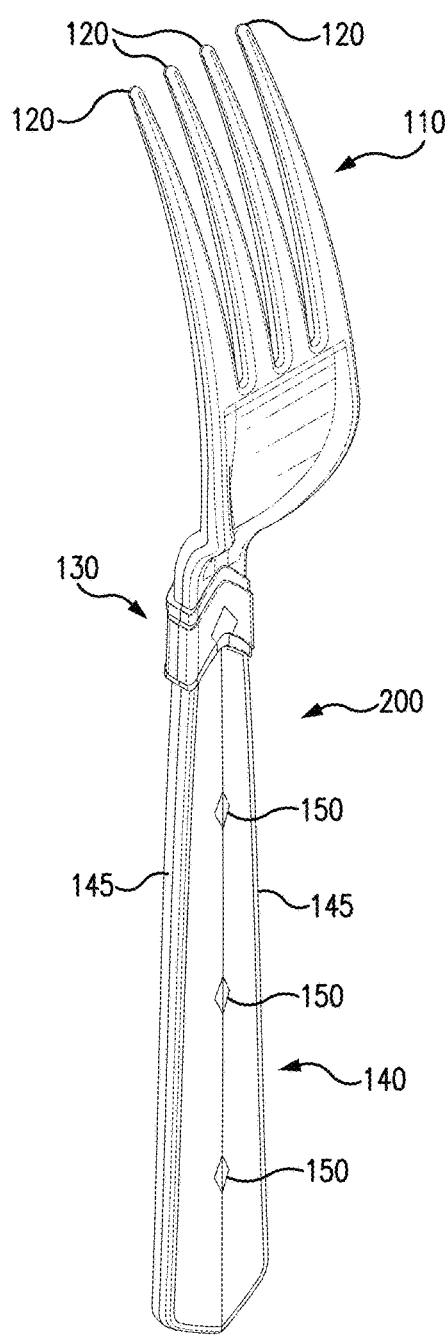
FIG. 1D is a back perspective view of the final molded fork of FIG. 1C.

FIGS. 1C and 1D illustrates the final molded fork 200 that includes the first and second shots. In addition to what is shown in FIGS. 1A and 1B, FIGS. 1C and 1D show the upper and lower portions of the handle but not the hole 155 as it is filled with the second shot.

Of course, it is easily envisioned that a spoon or knife can similarly be provided, as can other cutlery or similar sized disposable articles such as toothbrushes, razors and the like. These and similar articles are preferably manufactured using a generally known core-back injection molding process. Using that process technology facilitates the production of the desired number of articles with much higher cavitation/ throughout than prior molding strategies.

Certain visual effects can be provided on the handle by the provided thickness of the second shot of transparent or translucent material. For the portions that are provided upon the first shot, providing a uniform thickness of the second shot would result in the same color and optical appearance of that structure. Enhanced visual effects can also be created by varying the thickness of the second shot to create color differences. For example, when the first shot structure is a color other than white (such as blue, red, green, black, etc.) and the second shot is clear or translucent, thicker layers of the second shot will generally result in a dulling or lessening of the perceived color of the first shot while thinner layers of the second shot would allow more of the color of the first shot to be observed. Also, when the first shot molded structure is opaque white and the second shot is a transparent different color (such as blue, red, green etc.), thicker layers of the second shot will generally result in darker or deeper final colors while thinner layers will be lighter. One part may be molded from a material that is transparent or one color, while the other part is made from a material having a different color or vice versa. Thus, a skilled artisan can create many different types of designs and color combinations for the molded articles of the invention.

As noted herein, the articles of the invention are conveniently made by overmolding of a second shot of a second material over a first shot of a different material to make the article. The mold parts can be easily designed and configured to produce the desired first and second shots with the complete or nearly complete avoidance of parting lines, bleeding of the second material onto the first shot where not desired, and with designs that facilitate material flow and complete filling of all openings of the mold cavities without generating unfilled areas or air voids therein.

In particular, the first molded structure is obtained by the first shot of injected material into the cavities of the first mold. The first shot of the fork shown in FIGS. 1A and 1B has a white color while the second shot would typically be of a contrasting color or shading and such as blue, green, red, black or another color that contrasts with the color of the first molded structure. One of the parts can be transparent or translucent with or without a color. Although not preferred each shot can be transparent, translucent or colored. The second shot is provided upon the front and back of the handle as shown in FIGS. 1C and 1D.

In order to manufacture disposable articles such as cutlery and the like, certain elements have been designed into the structure of the cutlery that would not normally be used or required. These include (i) a first shot that is designed to have sidewalls that extend above and about the perimeter of the elongated handle in order to provide a border around the perimeter of the top handle portions of the second shot of the second material: preferably the first shot is designed to have sidewalls that also extend below above and about the perimeter of the elongated handle in order to provide a border around the perimeter of the bottom handle portions of the second shot of the second material; (ii) the upper portion of the handle of the first shot is preferably angled, tapered or sloped such that the thickness of the second shot is varied along the length of the handle; preferably the lower portion of the first shot is similarly configured; (iii) one or more flow-through holes in the handle portion of the first shot structure adjacent or near the injection port that allows the second shot material to pass through the first shot with the holes being preferably provided adjacent islands to fill all open areas of the mold to form the second shot; (iv) one or more second flow through holes in the first shot structure at the point of the transition area or neck ornamentation (to allow the second shot material to flow through to the back side of the neck ornamentation and appear as a design element on the front side) and (v) one or more flow channels for the second shot material in the neck ornamentation area.

The first feature is shown in FIGS. 1A and 1B. The sidewalls 145 provided on the upper and lower surfaces of the handle provide a number of advantages for the overmolding of the second shot. At least part of the top surface of the sidewalls is relatively flat to engage the mold surface and provide a closure against the flow of the injected molten polymer of the second shot between the sidewalls and mold surface.

Figure 7:
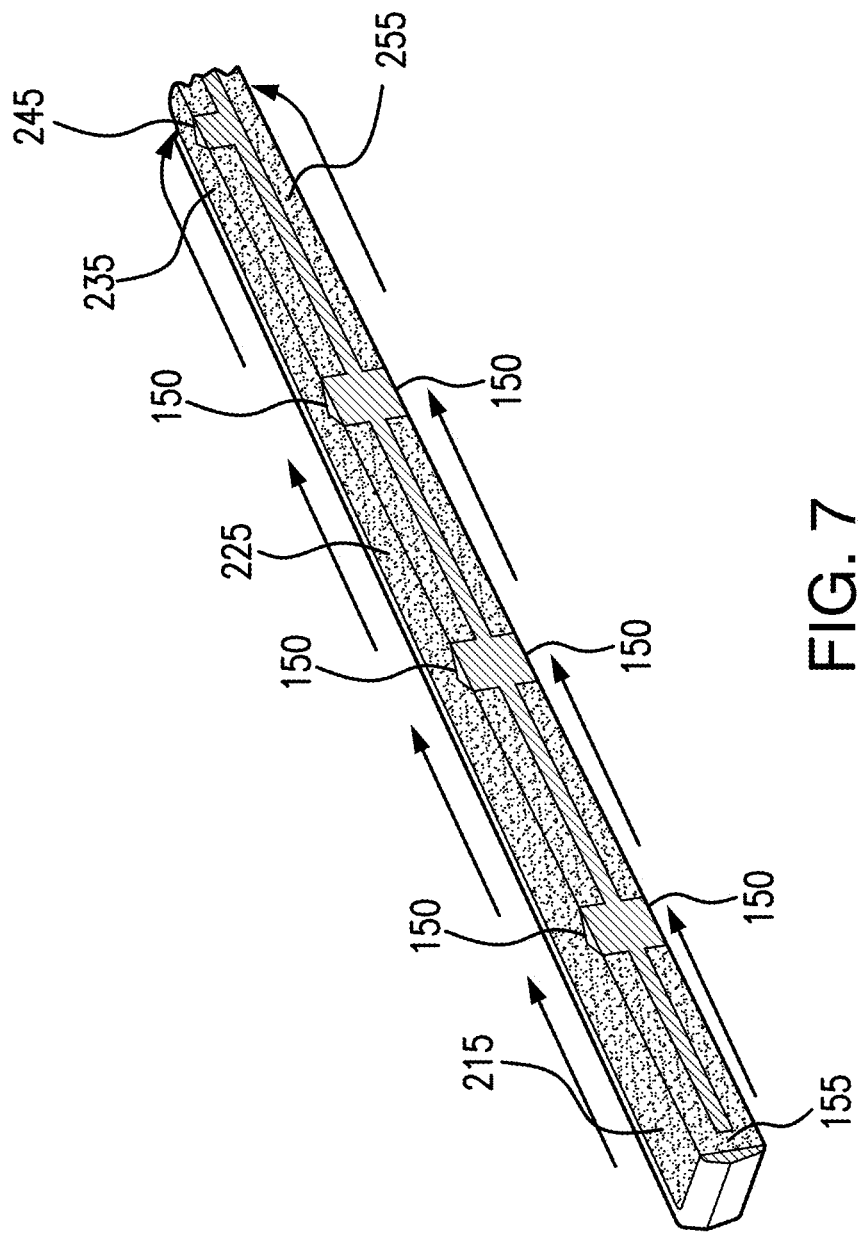
FIG. 7 is a cross-sectional view of an alternative embodiment of the handle to illustrate flow details of the second shot material along the top and back sides of the first shot and into the transition area.

The second feature is shown in FIG. 7. The provision of a relatively larger open area at the point where the second shot molten resin is introduced enables the second shot to more easily fill the open spaces that narrow from the injection point to remote ends of the second shot. With the reverse design, i.e., a smaller injection port to a larger open area to fill, it is possible that not all open areas become properly filled with the second shot resin.

The design of the first shot shown in FIGS. 1A, 1B and 7 allows the injected second material to fill in all open areas and form the second shot around and about the first shot to form the final molded article. The injection point A (see 160 in FIG. 2) is near the end of the handle close to the opening 155 between the top and bottom surfaces of the first shot. The second material thus flows from the injection as shown by the arrows. The space between the upper surface of the first shot and the mold provides an open area 215 that is filled with the second material to result in the thickness of the second shot. In the middle of the handle, the space between the upper surface of the first shot and the mold provides an open area 225 that has a slightly greater thickness for the second shot. At the front of the handle near the transition portion the space between the upper surface of the first shot and mold provides an open area 235 that results in a slightly smaller thickness for the second shot. The flow of second material continues to front diamond 245.

Alternatively, the entire top surface of the first shot can taper gradually from a larger thickness for the second shot at the injection point to lesser thickness in remote areas of the handle. The thickness of the first shot can also thin from the center towards the sidewalls. A skilled artisan can determine the optimum thickness configurations and variations for any particular article to be molded.

To facilitate a core-back molding process for the overmolding of the first shot, the lower surface of the first shot should be made to be uniform. In FIG. 7, the bottom part of the second shot is shown to have a uniform thickness. Because the core-back mechanism needs to be of uniform thickness, the first shot material on the core-back side needs to be designed with a uniform thickness of the second shot material on the bottom, core-back side. In fact, any varying of second-shot thickness to promote even resin flow has to happen on the non-core-back side.

Figure 2:
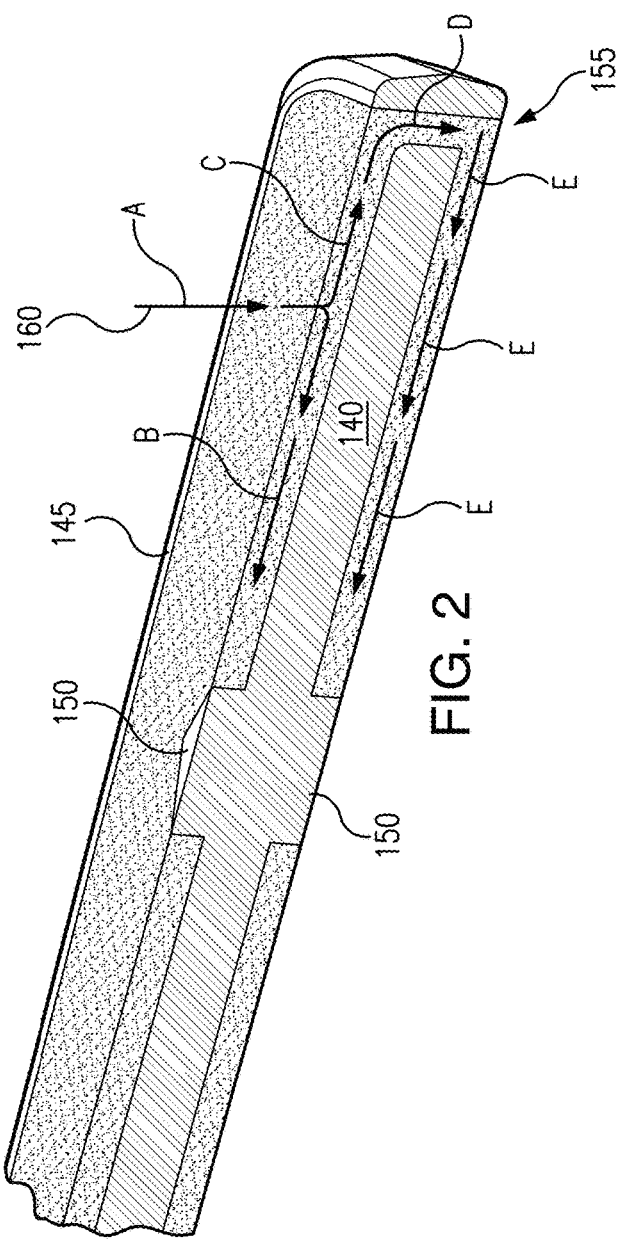
FIG. 2 is a cross-sectional view of the handle to illustrate further flow details of the second shot material as it is injected to overmold the first shot molded structure.
Figure 3:
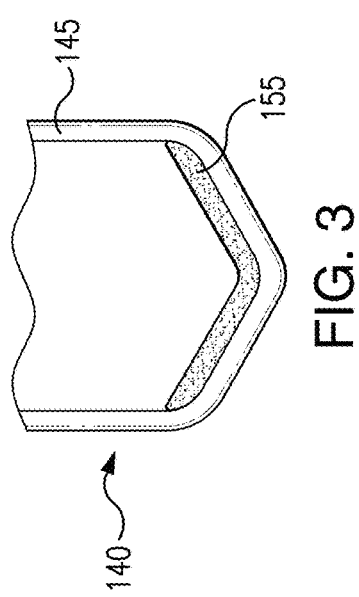
FIG. 3 is a top view of the end of the handle of the first shot molded structure to illustrate the opening that allows the second shot material to flow from the front of the first shot molded structure to the back.

Features (iii) to (v) are further described with regard to FIGS. 2-5. FIG. 2 is an illustration of the injection of the second shot material onto the handle of the first shot. Second shot material 160 is injected onto the lower top portion of the handle 140 of the first shot where indicated by the downward pointing arrow A. The flow of material is shown by arrows B and C. At the end of the handle, the second material flows through hole 155 along arrow D to gain access to the lower part or back side of the handle first shot. At that point, the material flows along the back part of the handle to fill in all open areas of the second shot geometry on the lower side of the handle. The material flows past the islands 150 which are provided on both the upper and lower surfaces of the handle 140. In particular, this arrangement favors overmolding on the upper and lower surfaces of a generally elongated article with emphasis on the ease of a two sided overmolding upon the first shot.

Placement of the hole 155 near the end of the handle is preferred but is not critical. The hole can be placed anywhere on the first shot near where the second shot material is injected. Generally the area beneath the injection point is slightly larger than surrounding areas so that the injected material can flow into all remote areas of the mold about the first shot.

The top surface of the first shot may optionally include one or more islands 150 positioned in a predetermined alignment with respect to the sidewalls, with the second shot material covering the side(s) but not the exposed surface of the islands. Also, the bottom surface of the first shot may further comprise one or more islands 150 which are positioned in a predetermined alignment with respect to the sidewalls, and again with the second shot material covering the side(s) but not the exposed surface of the islands.

The exposed surface of the islands 150 may have a circular, oval, polygonal or diamond perimeter and with vertical or close to vertical side(s) that have the same perimeter as the exposed surface of the islands. Alternatively, the islands can be configured as alphanumeric characters or text with the islands collectively forming a pattern or writing. The first shot and second shot are preferably of different colors such that the color of the exposed surfaces of the islands contrast with the color of the second shot. The islands also may be configured to appear as rivets to enhance the appearance of the utensil or other molded article.

The interface surfaces on the back side (or core-back) of the cutlery between the first and second shots should preferably have a zero degree draft or as close to zero degrees as possible. Generally, the draft angle for these interface surfaces will be less than ½ degree and preferably is zero degrees for the configuration of a core-back first shot molded structure. This is in contrast to the front sidewalls that are formed by the first mold and that would have normal draft angles that are greater than ½ degree and typically between 2 to 3 degrees on the cavity. The goal is to have completely vertical walls or sides for the core-back structures of the first shot molded structure. These interface surfaces includes the sides of the islands on the lower handle surfaces, and the sides of wall 145 on the lower surface that face the handle interior. Providing these surfaces with the zero degree draft is a good injection molding technique that ensures optimum product quality with less flashing or other deposition of undesired material that is injected into the molds.

On the cavity side of the molding, a draft of 2 or 3 degrees is preferred, and utilized in most areas of the design. A greater angle can be better in some designs, but three have been found to be sufficient for most moldings of the types disclosed herein for creating the molded articles of the present invention.

FIGS. 1C and 1D show the final molded fork that includes the handle having the second shot overmolded upon the first shot.

Referring now to FIGS. 4-6, the injected material for forming the second shot flows past the islands 150 on the upper and lower surfaces of the first shot of the handle 140, as shown by arrows B and E respectively. Optionally, on the lower surface, the material continues to flow as shown by arrow F into hole that forms a cavity that extends back to the upper surface of the handle. The injected second shot material flows through the return hole to create a separate second shot geometry on the upper surface of the part. The second shot material fills the cavity and the second shot geometry forms a decorative feature 165 in the transition area 130 on the upper side of the article. The decorative feature may be a diamond 165, preferably of contrasting color, as provided by the second shot injected material, with the feature positioned on upper surface 180 of the transition area 130. And while a diamond is illustrated, the decorative feature may have a circular, oval or polygonal or perimeter. Depending upon the size and location of the design, a second hole may not be necessary.

The combinations of these front to back holes and the zero draft angles for the walls and islands facilitate the efficient manufacture of the articles both as to the provision of higher cavitation tooling. This is also an optimal design for allowing the cores of the first molds to move in and out when reconfiguring to change from the first shot cavity to the second shot cavity. This reduces the maintenance required on the molds.

FIGS. 4 and 5 illustrate an additional structure of the transition area 130 in the form of top and bottom raised boundaries 170, 175 for the upper surface 180 of the transition area. These are shown as having a V shape but other shapes such as a U shape or combinations of shapes having curved and straight portions can be used. These shapes are configured to form upstanding walls around the upper surface 180. FIG. 6 illustrates the lower side of the molded article which include a decorative feature 185, also in the shape of a diamond although circular, oval or polygonal or perimeters are also possible. Decorative feature 185 includes a channel 188 which extends to the second shot on the lower side of the handle, as this is the path over which that the second shot material will flow to form the decorative features 165, 185. Also, decorative feature 185 is provided in lower surface 190 which is raised above the lower surface of the handle. Raised lower surface 190 is also configured with the same shaped top and bottom boundaries as upper surface 180. These coordinated structures allow multiple articles to nest with the raised boundaries 170, 175 of one article surrounding raised lower surface 190 of an adjacent article positioned above it. And while the configurations of the raised boundaries 170, 175 is not critical, the consideration that will facilitate nesting is to form the raised lower surface with a corresponding configuration. As shown, the V shaped boundaries 170, 175 match the V shaped ends of the raised surface 190.

The first or second material to be injected is preferably a plastic resin, an elastomer, or a polyurethane material and is used to form the first or second shots. As noted, one material contrasts the other by color, texture, hardness or another physical property. The injection of such materials is also improved in that the number of injection ports is reduced due to the provisions of the holes that allow the injected second shot material to flow from one side of the first shot molded structure to the other side and then back again to the first side.

The articles of the present invention facilitate faster and more efficient production compared to the articles made by the core-back injection molding equipment and methods disclosed in U.S. Pat. No. 5,049,343, the entire content of which is expressly incorporated herein by reference thereto. As noted, the present articles are designed with features in the first shot that facilitates and enhances the production of the second shot.

The molds provides different cavities that are configured to form the second shot in the open volume between the mold and the surface of the first shot, with the second shot not extending over the entire surface of the first shot. Thus, the injection of the second material forms the second shot that covers only a portion but not all of the surface of the first shot. Advantageously, the second material is different from the first material in type of material, color, texture, hardness or other physical property. Also, the second material can be plastic, an elastomer or polyurethane material.

And while FIGS. 1C and 1D illustrates the final article as an overmolded fork which is a preferred embodiment of the present invention, it is of course understood and easily envisioned that a spoon or knife can similarly be provided, as can other cutlery or similar sized disposable articles such as toothbrushes, razors and the like using the molds and processing techniques disclosed herein. The same handle configurations are generally provided with the working end of the article being a spoon bowl or knife blade instead of fork tines.

FIGS. 8-12 illustrate another embodiment of the invention, also in the form of a overmolded fork 300.

Figure 8A:
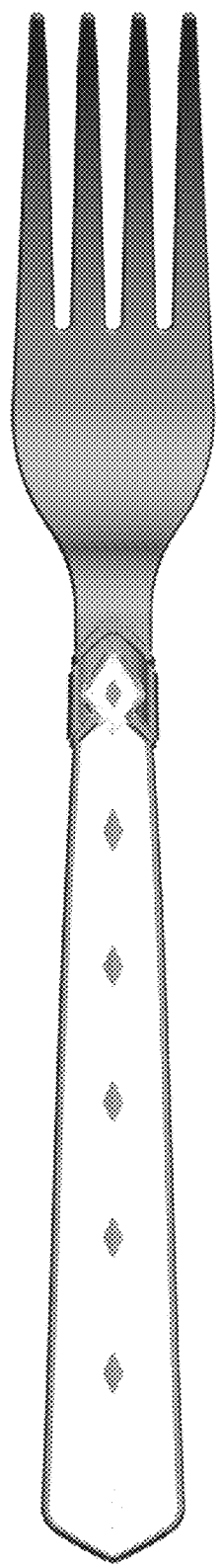
FIG. 8A is a front view of another overmolded fork which is illustrated as another preferred embodiment of the present invention.
Figure 8B:
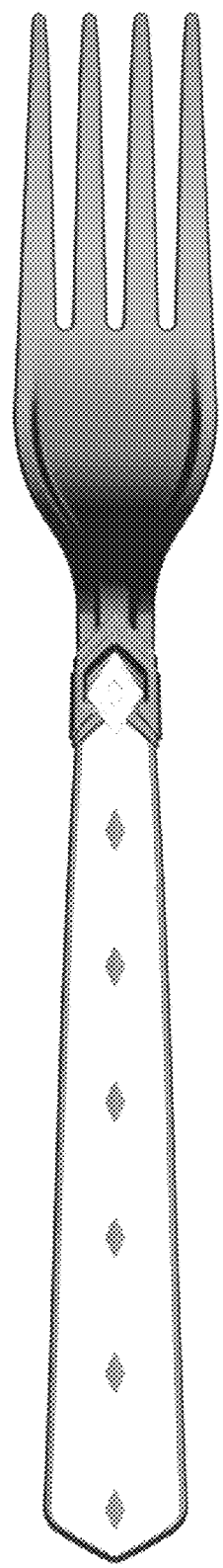
FIG. 8B is a rear view of the fork of FIG. 8A.

In FIGS. 8A and 8B, shading is used to illustrate the contrasting colors of the first and second shot molded structures. In FIGS. 9A, 9B, 10A and 10B, the inner diamond 305 in the transition area 310 and the five diamond shaped islands 315 are provided in the same color as the sidewalls or border 320 of the handle 325 as well as the working end 330. These would typically be of white or a lighter color or may be translucent or clear while the surrounding overmolded second shot would be of a different or contrasting color. Of course, the reverse arrangement is possible if desired.

Figures 9A, 9B:
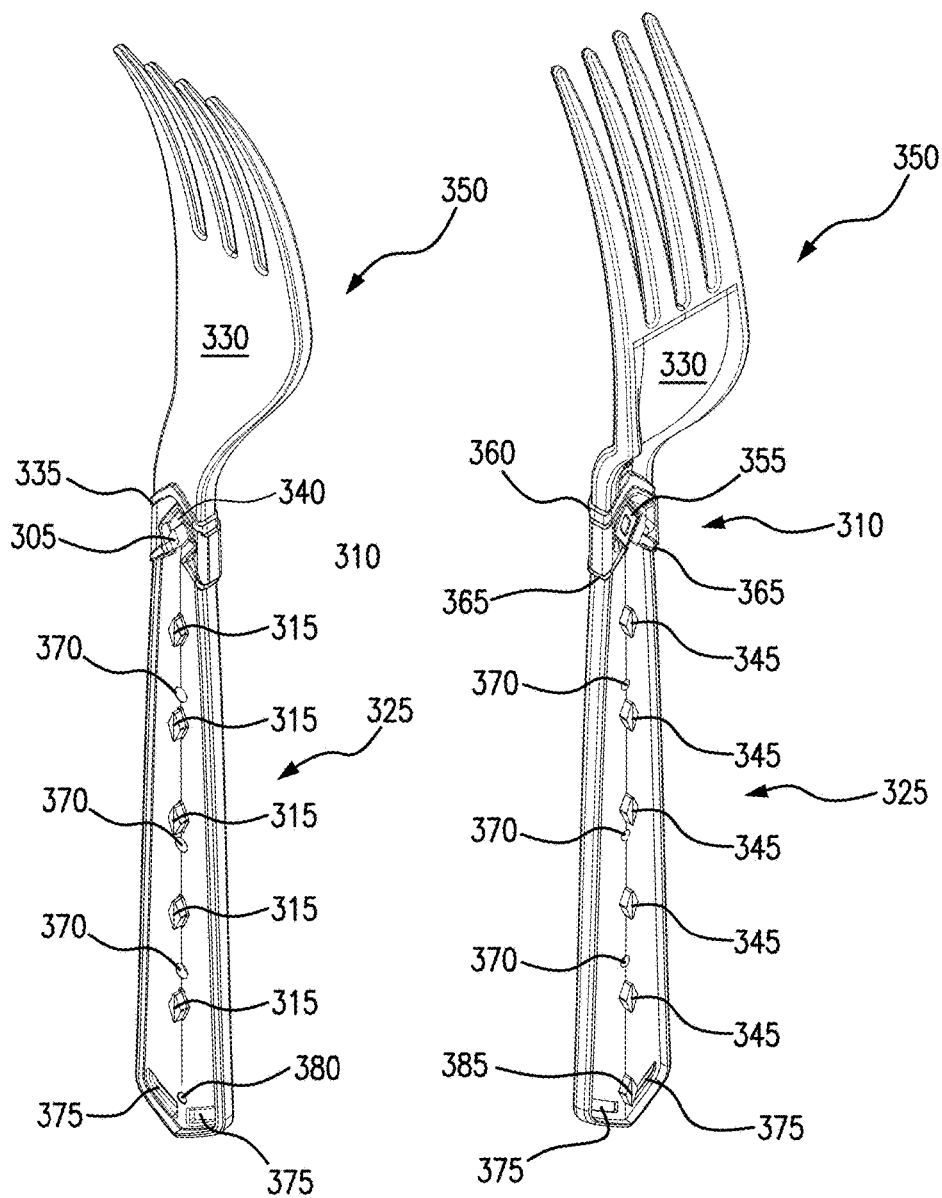
FIG. 9A is a front perspective view of a first shot molded structure for the fork of FIGS. 8A and 8B.
FIG. 9B is a back perspective view of the first shot molded structure of FIG. 9A.

While fork 300 has a number of features in common with fork 100 of the preceding figures, fork 300 provides a number of additional features which facilitate the core-back overmolding of the article. Certain of these features are illustrated in FIGS. 9A and 9B which illustrate the first shot molded structure.

The first shot molded structure 350 is designed to include a border or side wall 320 which surrounds the handle 325, with five islands 315 in the top surface of the handle portion 325 and one in the transition structure 310. The transition structure 310 includes a chevron shaped support 335 on the top side which protrudes from the surface of that structure. It also includes an open diamond faced hole 340 which includes a central diamond shaped island 305.

The bottom surface of the handle portion includes five islands 345 and one island 385 whereas the transition structure 310 includes a diamond shaped recess 355 On the back side, the transition structure includes a chevron-shaped recess 360 on the top portion and two recessed legs 365 on the bottom portion that are also recessed. This arrangement creates even spacing between the support legs and the distance that the back side diamond recess needs to be within the article to facilitate nesting of one article into another one.

The transition structure 310 is designed so that the raised portions on the top surface of the utensil are received in the recess on the backside of the utensil. This allows stacking of multiple utensils in a face to back manner to facilitate shipping and handling of the utensils as a larger connected collection. In particular, the backside of the utensil receives both the first shot and second shot diamonds of the transition structure of another molded article, as well as the chevron support and legs so that two utensils can snap lock together.

The first shot molded structure also includes a number of holes to allow the injected second shot material to flow therethrough to form the second shot molded structure and the final article. For the fork 300, three holes 370 placed along the handle portion in a generally central area thereof and spaced from each other allow injected second shot material to flow from one side of the first shot molded structure to the other. Additionally, at the lower end of the handle, two larger slots 375 oriented along the bottom end of the handle are also provided to allow the second shot to flow onto the top and bottom surfaces of the first shot.

Smaller holes 370 are along the central area of the first shot near the islands to allow the second shot material to flow throughout and completely fill the mold cavity to form the second shot molded structure.

The number of additional holes is not critical but at least one slot and one additional smaller hole is contemplated. In particular, multiple (2 to 4) slots and multiple (2 to 5) holes are preferred. Typically, at least one hole is provided for each two islands, two holes for three islands, etc. A skilled artisan can best determine the necessary number of holes for each article depending upon the length of the handle and the number of islands provided.

In addition to the islands 315, 345 providing a decorative feature to the handle, these islands provide stabilizing support for the handle portion 325. Also, a sixth island 385 is provided on the back side of the first shot opposite the injection point 380 for further support. Although that island is shown as a diamond like the other islands, it could be of any shape but is required to create a pedestal directly beneath the second shot injection point 390. As noted above, the islands 345 have sides of zero draft when the first shot is made by a core-back molding technique and the core-back is on the back side, while the top surface portions can be configured with standard draft as desired to secure the islands to the mold portions.

As shown for the fork 300, five islands are provided with a sixth beneath the injection point for the second shot resin. The same number of items would be used for a knife. For certain other articles, such as a spoon or smaller size utensils, only four islands and a fifth under the injection point have found to be suitable. The skilled artisan can determine the appropriate number of islands based on the length of the handle and the overall size of the molded article with more or less being used. Typically, the number of islands on the top side will vary between 3 and 10 while on the back side it will be between 4 and 11 due to the additional island placed beneath the injection point 390. As noted, this additional island 385 provides additional support for the handle portion 325 of the first shot molded structure beneath the injection point where the second shot material enters the mold.

Figures 10A, 10B:
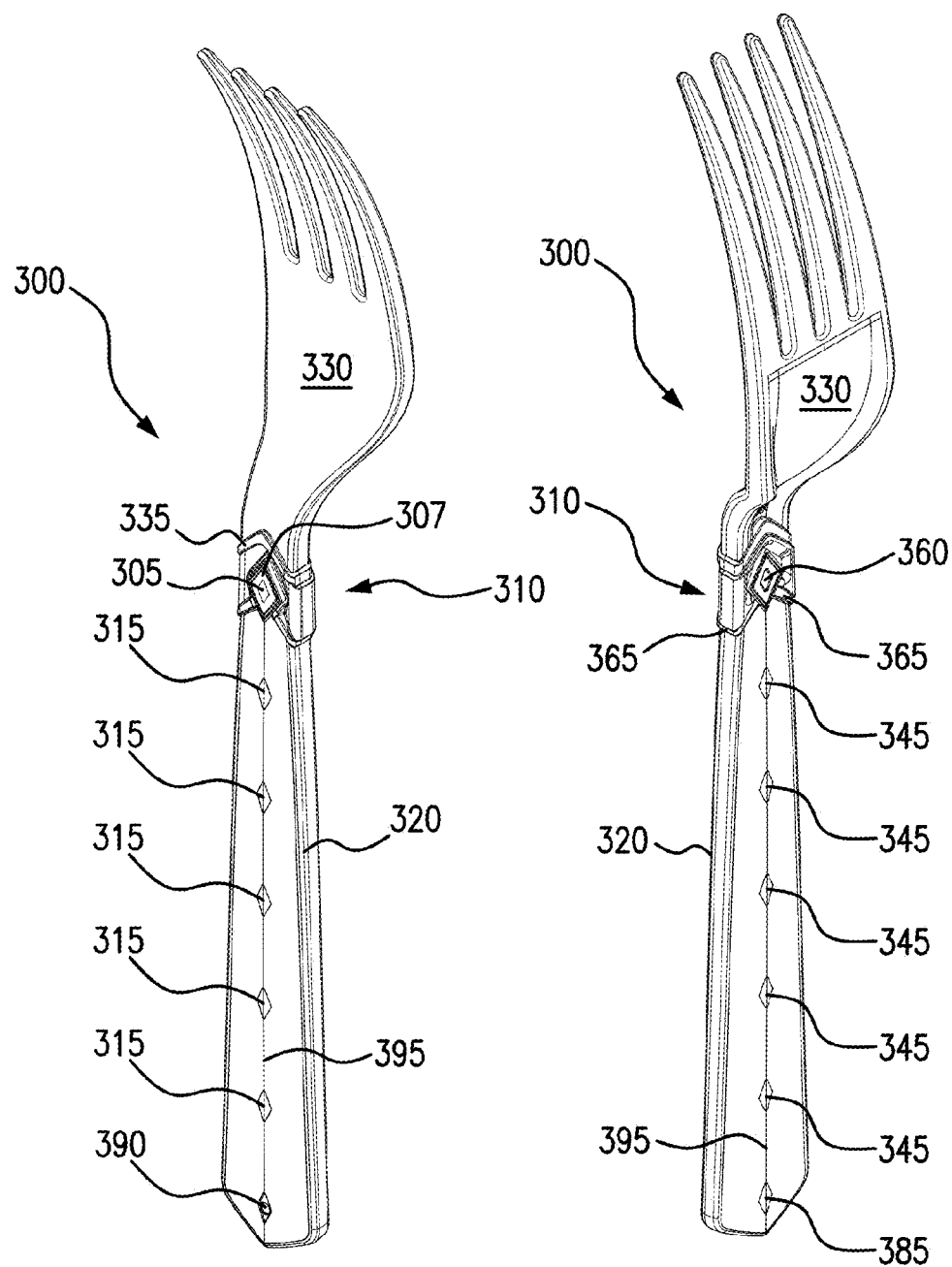
FIG. 10A is a front perspective view of the final overmolded fork that includes the first and second shot molded structures.
FIG. 10B is a back perspective view of the fork of FIG. 10A.

FIGS. 10A and 10B illustrate the final overmolded fork. In particular, the injection point 390 for the second shot material is made in a location above the point of injection 380 for the first shot, and is provided with a diamond appearance to mimic the appearances of the other islands. This actually helps hide the injection point for the second shot material that would otherwise appear on the second shot molded article. Also, the transition structure 310 includes a second diamond 307 which surrounds the first diamond 305 and forms a decorative two-color diamond which is received in the recess 355 on the back side of the transition structure 310.

A center line 395 is shown on the final molded product to delineate the right and left sides of both the front and back sides of the handle. The portions of the handle on either side of the centerline are preferably sloped linearly from a higher point along the centerline to a lower point near the sidewall 320. Of course the sloping of the top and bottom surfaces of the handle is an optional feature as those surfaces may instead be made flat or with a slight curved or arcuate shape instead of the linear sloping.

Figure 11:
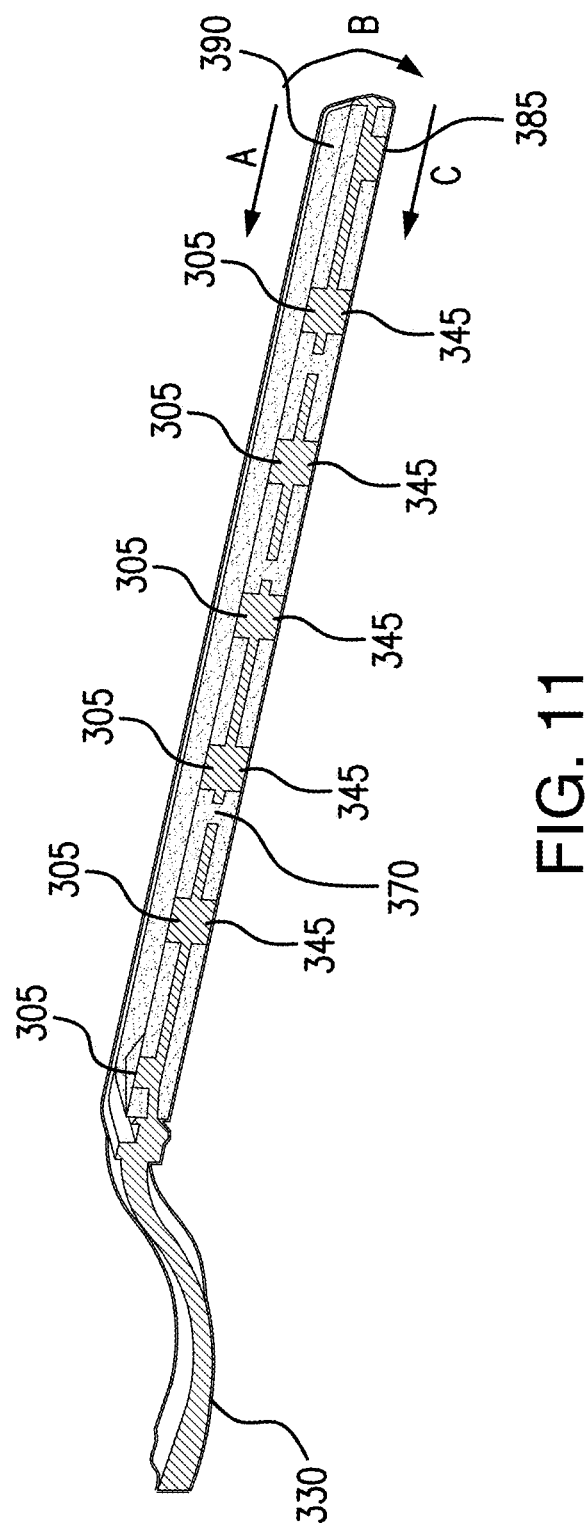
FIG. 11 is a cross-sectional view of the handle that also shows the flow of the second shot material.

FIG. 11 illustrates the resin flow into a mold surrounding the first shot, and through the various holes provided in the first shot. The resin is injected at point 390 and flows throughout the cavity between the first shot and the mold first towards the working end 330 as shown by Arrow A, and then towards the end of the utensil, through the slots onto the bottom surface of the first shot as shown by Arrow B, and finally towards the working end 330 of the article along the bottom surface of the first shot as shown by Arrow C. It also flows through the three holes through the first molding structure and when arriving at the transition structure fills in the larger diamond 307 therein.

For the core-back injection molding of the second shot over the first shot, another essential feature of the design of the articles of the present invention involves the sidewalls of the first shot the handle. These are configured to assure that the second shot material flows upon the first shot. The sidewalls are flat on the top and bottom but they may be curved or rounded between the flat tops or bottoms and their sides.

After the injection is complete and the final dual shot article is formed, the second material is allowed to set into the final shape before removing the article from the mold.

The use of the core-back procedure enables the process to be rapidly implemented for the high volume manufacture of the articles. Also, the use of multiple mold cavities to form large numbers of molded articles after the second shot further enhances production.

The first shot is designed to preferably have zero draft in the core-back area to facilitate its disengagement with the mold after formation. This is accomplished by the use of substantially straight walls on the sides of the islands and on the sidewalls.

Figure 12:
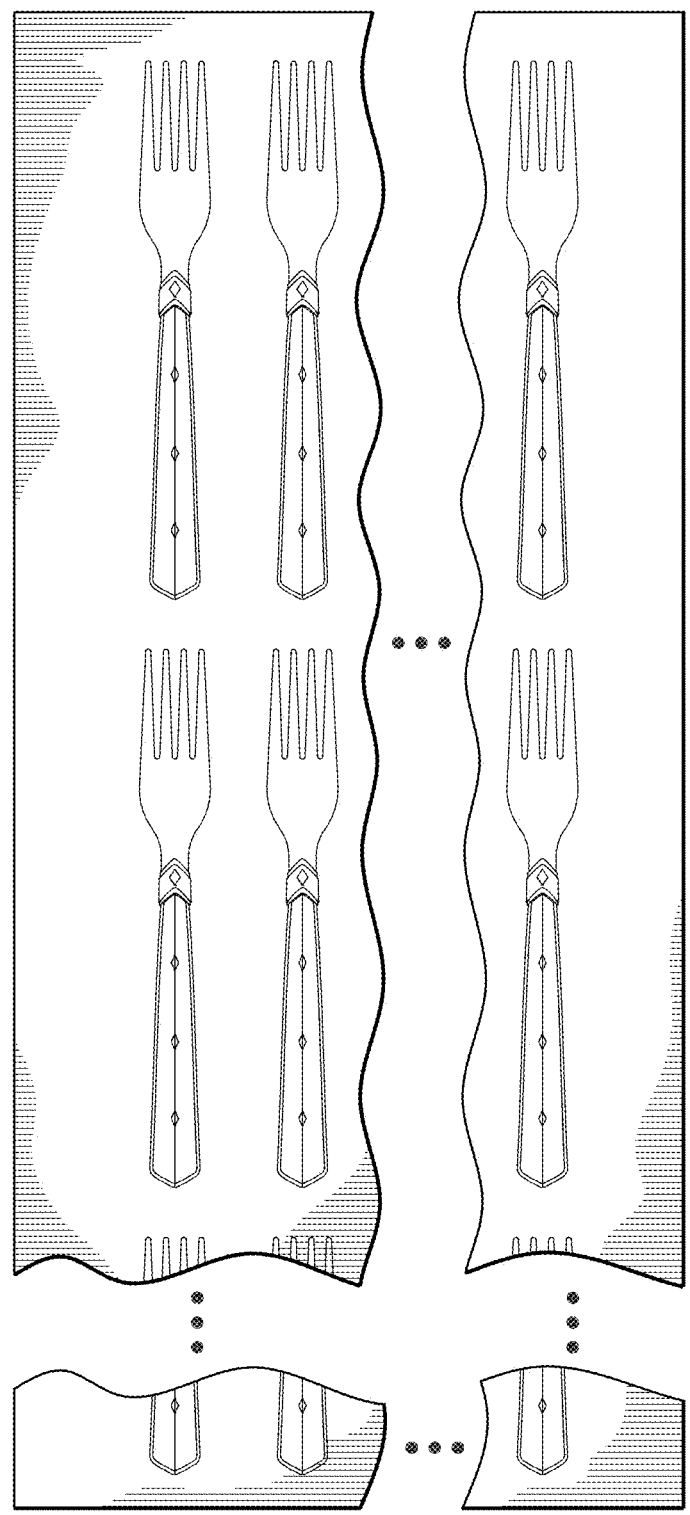
FIG. 12 is a partial view of the front surface of a mold form for making multiple molded articles according to the invention.

Regarding the number of articles to be manufactured, for disposable articles such as cutlery and the like, a mold having an array of 8×8 or 8×9 is preferably utilized so that the size of the mold does not become too large. Two side by side arrays of 8 by 9 are possible in each mold for a total of 144 articles to be molded at one time. Part of the mold surface is shown in FIG. 12. For the same size mold, however, a larger number of smaller parts can be provided, or a smaller number of larger parts can be provided in the same size mold. The only limiting factor is that there must be sufficient spacing between the rows and columns to accommodate the second mold when positioned adjacent the first mold.

In essence, it should be understood that the foregoing is solely considered as illustrative only of the principles of the invention. Furthermore, since numerous alterations and modifications and changes will readily be apparent and effected thereto by those having ordinary skill in the art, it is not desired to limit the invention to the exact constructions as demonstrated in this disclosure. For example, for certain molded articles, the first and second molded structures can be made separately and then joined together with adhesive or in a snap-locking manner. Accordingly all suitable modifications and equivalents may be resorted to falling within the scope of the invention so as long as, all the desired inherent technical features and attributes are not lost.

In other modifications, the molded articles can have any other dimensions than the ones specifically described herein. Exemplary handles may have a flattened or slightly rounded cross section, but other shapes such as a substantially circular cross section, a substantially square or rectangular cross section, or combinations of the above can equally be used. Moreover, the islands may have a top surface comprising any suitable shape or topography.

Even though a fork is illustrated as an example, the invention similarly pertains to any other hand tool, which is encompassed by the scope of the present invention. As such, the invention similarly encompasses hand tools such as but not limited to knives, spoons, forks, salad forks, soup spoons, butter knives, steak knives, cocktail forks, serving forks and spoons, tongs, chop sticks, cake cutters, spatulas, ladles, food picks, kitchen utensils, and the like.

Unless defined otherwise, all technical and scientific terms used herein have same meaning as commonly understood by the person of ordinary skill in the art to which this invention belongs. As used herein and in the appended claims, the singular form "a", "and", and "the" include plural referents unless the context clearly dictates otherwise. All technical and scientific terms used herein have the same meaning Thus the scope of the embodiments of the present invention should be determined by the appended claims and their legal equivalents rather than by the Figures.

What is claimed is:

1. A molded article of cutlery comprising:
a first shot molded structure comprising a working end and an elongated handle support molded from a first plastic material and having top and bottom surfaces and a length which extends away from the working end, and a second shot molded structure including top and bottom handle portions that form the upper and lower surfaces of the handle on the handle support of the first shot molded structure;
wherein the first shot molded structure includes (a) a plurality of openings configured for allowing passage of second shot plastic material through the first molded structure to access both the top and bottom surfaces of the handle support, wherein the openings include one or more open slots located adjacent the sidewall at the end of the article that is furthest away from the working end, and (b) one or more sidewalls having a first height that extends above the top surface and about the perimeter of the elongated handle support extending to but not including the working end and located at least on each side of the top surface along the length of the handle support to provide a border around the perimeter of the handle support, with the sidewall(s) configured to surround or encompass a subsequently provided second shot molded structure on the top surface of the handle support, wherein the sidewall(s) have at least partially flat top surfaces to conform to mold surfaces and straight, curved or angled outer profiles.

2. The molded article of cutlery of claim 1, wherein the sidewall(s) on the top surface of the first shot molded structure surrounds or encompasses the top handle portion of the second shot, with the second molded structure providing with the first height of the sidewall(s) a top surface for the handle to thus form an article having a working end and overmolded handle opposite the working end.

3. The molded article of cutlery of claim 1, wherein the first shot molded structure includes an ornamental transition structure between the working end and handle support and the one or more sidewalls terminate at the transition structure.

4. The molded article of cutlery of claim 2, wherein the one or more sidewalls of the first shot molded structure have a second height that extends below the bottom surface and about the perimeter of the elongated handle support on each side of the bottom surface along the length of the handle support to provide a border around the perimeter of the bottom handle portions of the second shot molded structure, with the bottom handle portions providing with the second height of sidewall(s) a bottom surface for the handle, and wherein the first and second shot molded structures are of contrasting colors.

5. The molded article of cutlery of claim 4, wherein the first shot molded structure has at least three spaced openings along the length of the handle support, and wherein the sidewall(s) extending below the bottom surface have at least partially flat top surfaces to conform to mold surfaces and straight, curved or angled outer profiles.

6. The molded article of cutlery of claim 1, wherein the openings of the first shot molded structure include one or more open slots located adjacent the sidewall at the end of the article that is furthest away from the working end.

7. The molded article of cutlery of claim 6, wherein the openings of the first shot molded structure include an open slot having a V- or U-shape extending across the width of the handle support adjacent an injection point for second shot material.

8. The molded article of cutlery of claim 5, wherein one or more additional openings are provided along the length of the handle portion of the first shot molded structure to facilitate flow of the second shot material.

9. The molded article of cutlery of claim 1, wherein the handle support of the first shot molded structure includes a plurality of islands wherein the islands have top surfaces that are not covered by the second shot.

10. A molded article of cutlery comprising:
a first shot molded structure comprising a working end and an elongated handle support molded from a first plastic material and having top and bottom surfaces and a length which extends away from the working end;
wherein the first shot molded structure includes (a) a plurality of openings configured for allowing passage of second shot plastic material through the first molded structure to access both the top and bottom surfaces of the handle support, and (b) one or more sidewalls having a first height that extends above the top surface and about the perimeter of the elongated handle support extending to but not including the working end and located at least on each side of the top surface along the length of the handle support to provide a border around the perimeter of the handle support, with the sidewall(s) configured to surround or encompass a subsequently provided second shot molded structure on the top surface of the handle support, wherein the openings of the first shot molded structure include one or more open slots located adjacent the sidewall at the end of the article that is furthest away from the working end,
wherein the molded handle includes a transition area connected to the working end, and wherein the first shot molded structure includes a further opening in the transition area through which the second shot material passes to connect the lower surface of the handle with an upper portion of the transition area.

11. The molded article of cutlery of claim 9, wherein the handle of the first shot molded structure also includes islands on the lower surface, with the islands on the bottom surface configured to have zero degree drafts and with one island located opposite an injection point for the second shot material.

12. The molded article of cutlery of claim 9, wherein the islands are present both on the upper and lower surfaces of the handle support of the first molded structure and have top surface portions that are flush with but not covered by the upper and lower surfaces of the second shot.

13. The molded article of cutlery of claim 1 wherein the upper surface of the handle support of the first shot molded structure is angled, tapered, curved or sloped, the lower surface of the handle support of the first shot molded structure is angled, tapered, curved or sloped, or both surfaces of the handle support of the first shot molded structure are angled, tapered, curved or sloped.

14. The molded article of cutlery of claim 3, wherein the upper surface of the first shot molded structure provides the second shot molded structure to be thickest at the furthermost end of the handle and thinnest at the transition area in order to facilitate flow of the second material to the transition area.

15. The molded article of cutlery of claim 1 wherein the working end is a knife, spoon, fork, tong, chop stick, spatula, ladle or food pick.

16. A molded article of cutlery comprising:
a first shot molded structure comprising a working end and an elongated handle support molded from a first plastic material and having top and bottom surfaces and a length which extends away from the working end and (a) a plurality of openings configured for allowing passage of second shot plastic material through the first molded structure to access both the top and bottom surfaces of the handle support, and (b) one or more sidewalls having a first height that extends above the top surface and about the perimeter of the elongated handle support extending to but not including the working end and located at least on each side of the top surface along the length of the handle support to provide a border around the perimeter of the handle support;
a second shot molded structure including top and bottom handle portions that form the upper and lower surfaces of the handle on the handle support of the first shot molded structure;
wherein the sidewall(s) on the top surface of the first shot molded structure surrounds or encompasses the top handle portion of the second shot, with the second molded structure providing with the first height of the sidewall(s) a top surface for the handle to thus form an article having a working end and overmolded handle opposite the working end, wherein the sidewall(s) have at least partially flat top surfaces to conform to mold surfaces and straight, curved or angled outer profiles;
wherein the one or more sidewalls of the first shot molded structure have a second height that extends below the bottom surface and about the perimeter of the elongated handle support on each side of the bottom surface along the length of the handle support to provide a border around the perimeter of the bottom handle portions of the second shot molded structure, with the bottom handle portions providing with the second height of sidewall(s) a bottom surface for the handle;
wherein the first shot molded structure has at least three spaced openings along the length of the handle support, with the openings including one or more open slots located adjacent the sidewall at the end of the article that is furthest away from the working end; wherein the sidewall(s) have at least partially flat top surfaces to conform to mold surfaces and straight, curved or angled outer profiles; and
wherein the first and second shot molded structures are of contrasting colors.

17. The molded article of cutlery of claim 16, wherein the openings of the first shot molded structure include an open slot having a V- or U-shape extending across the width of the handle support adjacent an injection point for second shot material.

18. The molded article of cutlery of claim 16, wherein one or more additional openings are provided along the length of the handle portion of the first shot molded structure to facilitate flow of the second shot material.

19. The molded article of cutlery of claim 1 wherein the support core is tapered from a relatively thicker central longitudinal portion to relatively thinner side portions that are connected to the sidewall(s).

20. The molded article of cutlery of claim 16 wherein the support core is tapered from a relatively thicker central longitudinal portion to relatively thinner side portions that are connected to the sidewall(s).

21. The molded article of cutlery of claim 1 wherein the article is a fork or spoon.

22. The molded article of cutlery of claim 10 further comprising a second shot molded structure including top and bottom handle portions that form the upper and lower surfaces of the handle on the handle support of the first shot molded structure and that fills the opening(s) in the transition area, with the first shot material being of a different color than the second shot material.

23. The molded article of cutlery of claim 10, wherein the working end is a knife, spoon, fork, tong, chop stick, spatula, ladle or food pick.

24. The molded article of cutlery of claim 16, wherein the working end is a knife, spoon, fork, tong, chop stick, spatula, ladle or food pick.

* * * * *